United States Patent Office 3,340,327
Patented Sept. 5, 1967

3,340,327
FUMARIC ACID-POLYOXYALKYLENE GLYCOL-DICYCLOPENTADIENE POLYESTERS CURABLE WITH VINYL MONOMER AND MIXTURES THEREOF
Norman Spellberg, Orinda, and John W. Lorimer, Berkeley, Calif., assignors to Desoto, Inc., a corporation of Delaware
No Drawing. Filed Mar. 13, 1961, Ser. No. 95,049
17 Claims. (Cl. 260—861)

The present invention relates to new resinous polyesters capable of rapid low temperature cure, even in the presence of air. These polyesters, in contrast with those known to the art, are curable per se using heat in the absence of any curing agent. The invention includes cure of the resinus polyesters with ethylenically unsaturated monomers in the presence of a free-radical generating polymerization catalyst to provide curing systems which will cure rapidly at low temperature in the presence of air and which can, in some instances, be cured in the presence of air at room tempearture. The invention still further includes the use of aminoplast resins to further enhance desired film properties.

The cure of ethylenically unsaturated polyester resins with vinyl monomers in the presence of a free-radical generating polymerization catalyst is well known. However, in the absence of the vinyl monomer and the catalyst, these resins do not cure to provide continuous, integral films having useful properties. The invention provides new ethylenically unsaturated polyester resins which are not only curable with vinyl monomers in conventional manner to yield important advantages as will be later discussed in greater detail, but which are capable of producing useful cured films when subjected to heat in the absence of vinyl monomer and polymerization catalyst.

The inhibition of vinyl free-radical initiated polymerization by the presence of oxygen is well known. Along this line, the achievement of a tack-free, thermoset, cross-linked surface in ethylenically unsaturated polyester resins cured in the presence of air by free-radical initiated polymerization with vinyl monomers represents a standing problem in the polyester resin field. While many efforts to overcome this problem have been made, none of these have been fully successful. In general, the polyester resins of the art which are curable in the presence of air are of two types, neither of which is fully satisfactory. In one direction, a wax which exudes to the surface during cure may be used, but this produces a mottled surface which cannot be recoated without sanding. Also, the wax type polyester coating cannot be force cured since, at elevated temperatures, the wax becomes soluble and does not exude to the surface to form the necessary oxygen barrier. In another direction, the polyester resin itself may be made hard enough to be tack free. In these instances, however, there is no satisfactory cure at the surface and, as a result, the surface has poor mar resistance and poor solvent resistance. Also, freedom from surface tack is frequently obtained at the expense of film flexibility. Further, prior polyester resins capable of air cure are very slow curing in comparison with those of the present invention.

In accordance with the invention, a polyester resin is provided by heat-reacting an ethylenically unsaturated dicarboxylic acid component, including a major molar proportion of fumaric acid, with a glycol component, including a major molar proportion of an ether glycol, and dicyclopentadiene in proportions of at least 0.2 mol of dicyclopentadiene per mol of ethylenically unsaturated dicarboxylic acid. Preferably, and to retain sufficient alpha,beta-ethylenic reactivity to permit coreaction with vinyl monomers, the proportion of dicyclopentadiene used should not exceed 0.6 mol of dicyclopentadiene per mol of ethylenically unsaturated dicarboxylic acid.

The essential unsaturated dicarboxylic acid component in the invention is fumaric acid. While other ethylenically unsaturated carboxylic acids may be present in an amount up to 50 mol percent based on the total mols of unsaturated dicarboxylic acid, excessive substitution of fumaric acid by other acids, even by maleic acid, which is an isomer of fumaric acid, is not satisfactory because the desired new properties are unduly sacrificed. Preferably, unsaturated acids other than fumaric are present in an amount not exceeding 15 mol percent and are most preferably completely absent. Other dicarboxylic acids which may optionally be present in small amount, e.g., up to 10 mol percent based on total acids, are illustrated by one or more of the phthalic acids, adipic acid, etc.

The glycol component is essentially limited to ether glycols such as diethylene glycol, triethylene glycol, dibutylene glycol and similar polyoxyalkylene glycols having a moecular weight up to about 1200, preferably not in excess of 600, the preferred glycols being those of lowest molecular weight in each category, e.g., the diglycol. The ether glycol is essential to the invention. Thus, complete substitution of 1,5 pentanediol for diethylene glycol, eliminates the unusual mar resistance obtained by the invention upon mere air drying.

The fact that ether glycols are essential to the invention does not eliminate the presence, or even the desirability, of using minor proportions up to 50 mol percent, based on total glycol, of other glycols, especially short chain glycols such as ethylene glycol, so long as the ether glycol is present in the system to exert its function. Suitable glycols which may be present in minor proportion are illustrated by ethylene glycol, propylene glycol, butylene glycol, 1,5 pentanediol, di- and trimethylol propane, neopentyl glycol, bisphenol based diols, etc. Polyhydric alcohols containing three or more reactive hydroxy groups such as glycerin, pentaerythritol, etc., are desirably absent but minor amounts up to about 10 mol percent may be tolerated, especially when the polyesterification reaction is conducted with care to avoid gelation. Preferably at least 60 mol percent of the glycol component is polyoxyalkylene glycol. Desirably, at least 75 mol percent of the glycol component is polyoxyalkylene glycol having a molecular weight up to 600.

The dicarboxylic acid component and the glycol component are desirably used in equivalent proportions of from 1.5:1 to 1:1.5, preferably in equivalent proportions from 1.25:1 to 1:1.25. It is particularly preferred to employ at least 5 equivalent percent of excess hydroxyl functionality.

The use of dicyclopentadiene is also critical to the invention as is illustrated by the fact that substitution of cyclopentadiene or pentadiene for dicyclopentadiene fails to produce a polyester having the unique air-drying and fast curing properties obtained by the invention. Again, and while dicyclopentadiene is important, minor amounts, up to 50 mol percent of the dicyclopentadiene component, may be replaced by other dienes such as cyclopentadiene, any of the pentadienes, 1,4-butadiene, tricyclopentadiene and tetracyclopentadiene. Preferably, at least 75 mol percent of the diene component is dicyclopentadiene.

When it is desired to employ the polyester in combination with vinyl monomers, at least 40% of the unsaturated dicarboxylic acid component must be permitted to remain unreacted during production of the polyester, so as to retain sufficient $\alpha,\beta$-ethylenic unsaturation for the later copolymerization with the vinyl monomer.

The dicyclopentadiene component is desirably, but not necessarily, incorporated into the polyester before the polyesterification reaction is completed. Thus, it is preferred to correct the dicyclopentadiene with the unsaturated dicarboxylic acid and ether glycol components of the polyester at the same time that the polyester is being formed, such procedure including the formation of an adduct between dicyclopentadiene and the unsaturated dicarboxylic acid.

The resinous polyesters which are produced in accordance with the invention are useful as coating and laminating resins either alone or in combination with various curing agents, including amines or driers, to aid in homopolymerization or oxidative cure, or in combination with ethylenically unsaturated curing agents. These resinous polyesters, either alone or in combination, are particularly useful in the field of coatings where the resinous polyester is distributed in a liquid medium which may be either reactive, nonreactive, or partially reactive. Utility is not, however, limited to coating but includes laminating especially in combination with glass fibers or fabrics. Moreover, and especially in combination with ethylenically unsaturated monomers and low temperature reactive free radical generating catalysts, the products of the invention are useful in casting and molding and they may be heavily loaded with various fillers, especially mineral fillers, to provide trowelable composition having diverse utility including patching.

The invention is illustrated in the examples which follow:

EXAMPLE 1

Polyester production 2.3 mols of diethylene glycol, 1.0 mol of ethylene glycol, 3.0 mols of fumaric acid and 1.2 mols of dicyclopentadiene are charged to a reactor equipped for azeotropic removal of the water of esterification. 0.1 percent by weight of triphenyl phosphite, based on the total weight of reactants, is added to reduce the formation of color bodies, and xylene in an amount of 3% is added to permit the mixture to be refluxed. The mixture is gradually heated to 425° F. in a nitrogen atmosphere and water of esterification is continuously removed, the condensed xylene being returned to the reactor. The refluxing mixture is maintained at 425° F. with constant removal of water until test specimens show an acid number in the range of 15–40 which indicates that the reaction is sufficiently complete for purposes of the invention. The polyester product is then cooled and suitably cut as desired for the purpose at hand.

While the temperature of coreaction is not a primary feature of the invention, suitable temperatures for the coreaction at atmospheric pressure and in the absence of catalysts are from 375–450° F., the 425° F. temperature set forth in the present example being a particularly preferred reaction temperature.

EXAMPLE 2

Polyester coating composition

When the polyester product of Example 1 has cooled to a temperature below 250° F., the solution is then quite viscous and is thinned with a non-reactive solvent. In the present example, thinning is effected with an 80/20 weight ratio mixture of xylene and ethylene glycol monobutyl ether to provide a solution at room temperature containing 60% non-volatile solids. This solution constitutes a useful clear coating composition which can be pigmented, if desired, a suitable pigment being titanium dioxide. These coating compositions, clear or pigmented, can be applied to metal or other surfaces and cured at as low a baking schedule as 5 minutes at 250° F. to provide hard, adherent and flexible coatings.

It should be noted from the foregoing example that the polyester resins provided by the invention can be cured through the use of heat alone and in the absence of any extraneous curing agent. This is not to suggest that curing agents cannot be used, if desired, such as metal driers, but the present example will illustrate the fact that these are not essential.

EXAMPLE 3

Use of aminoplast resins

The solution coating compositions are desirably modified by the addition of an aminoplast resin such as urea-formaldehyde resin, melamine-formaldehyde resin, alkyl- or aryl-substituted melamine-formaldehyde resin (n-butyl and phenyl mono-substituted melamines being illustrative), and benzoguanamine-formaldehyde resins. These resins are condensation products of urea or melamine with sufficient formaldehyde to provide heat-hardening properties and the condensation products are etherified with a $C_3$–$C_8$ alcohol to provide solvent solubility. Thus, butylated urea-formaldehyde resin or butylated melamine-formaldehyde resin are used in the present example in the form a 50% solvent solution of the resin in a solvent medium constituted by xylene and butanol in weight proportions of 50/50. Addition of either one the aminoplast solutions specified to the clear or pigmented solution coating compositions of Example 2 in an amount to provide 10% by weight of aminoplast resin, based on total resin solids, provides a coating composition curable with the same baking schedule to provide films of increased hardness and improved chemical resistance, e.g., resistance to alkali.

The aminoplast resin may be used in proportions of from 3–35% by weight, based on total resin solids, the 10% value used in the present example illustrating a preferred proportion.

Corresponding results may also be obtained using solvent-soluble, heat-hardening condensation products of formaldehyde with benzoguanamine, n-butyl melamine and phenyl melamine.

EXAMPLE 4

Cure with ethylenically unsaturated monomer (styrene)

When the polyester product of Example 1 has cooled to a temperature of about 300° F., 100–400 parts per million of para-tert. butyl catechol is added for stability. Upon further cooling to a temperature below 250° F., the solution is thinned to 60% non-volatile solids with styrene to provide a solution of unsaturated polyester and unsaturated monomer (styrene) which is adapted to be copolymerized with the styrene acting as a cross-linking agent for the polyester during the copolymerization. To 100 parts of this solution of polyester in styrene (a minor proportion of xylene is present), is added 20 parts of styrene having dissolved therein 2 parts of a 6% solution of cobalt naphthenate in toluene. The cobalt naphthenate is a drier which promotes oxidative cure to permit drying of the surface of a deposited film at room temperature in the presence of air, and serves as an accelerator in conjunction with the peroxide catalyst. There is also added 3.3 parts of a 60% solution of methyl ethyl ketone peroxide in dibutyl phthalate to serve as copolymerization catalyst. Catalyst addition is desirably delayed until just before use because the coating composition including the catalyst has a pot life of about 5 minutes. Films of the coating composition cure in the presence of air at room temperature in about one hour to a condition where the partially cured surface will no longer show fingers prints. After 16 hours of air drying, the films are mar proof in that theu resist marring when rapidly scratched with the finger nail. If desired, by using an oven maintained at 150° F., the films can be cured adequately in only 3 minutes.

The rapid low temperature specified is a point of considerable importance. Commercially available polyesters cured with styrene and listed as having air curing properties, require a 3–5 hour air drying time after curing for 1–2 hours at 150° F., before they will cure to characteristics of hardness and mar proofness which correspond substantially with those achieved in the present example, by exposure to 150° F. for 3 minutes.

In contract with the present example, substitution of 1,5 pentanediol for diethylene glycol provides a coating composition which does not air dry to provide a mar proof film and the curing rate of baked free films is decreased by more than 50%.

Methyl ethyl ketone peroxide has been used in the foregoing example to illustrate free-radical generating copolymerization catalysts which are active at low temperatures, e.g., from 30–50° C. Various other free-radical generating catalysts operative at low temperatures are also usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

As will be evident, the selection of a free-radical generating catalyst which is active at low temperatures provides a coating composition having very limited stability. Stability may, however, be improved by utilizing catalysts which are active to generate free radicals at somewhat elevated temperatures of about 60° C., in which event the coating compositions have greatly increased pot life and are still adapted for rapid cure at very low baking temperatures. Suitable catalysts of this type are illustrated by t-butyl hydroperoxide, methyl amyl ketone peroxide, acetyl peroxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Still greater stability can be achieved through the use of free-radical generating catalysts which become active at still more elevated temperatures of about 100° C., such as t-butyl perphthalic acid, p-chlorobenozyl peroxide, t-butyl peracetate, dibenzyl diperoxide and di-t-butyl peroxide.

If desired, both the drier and the free-radical catalyst can be combined in the same coating solution or, if desired, they may be placed in separate components with the two components being applied simultaneously as by a two-headed spray gun, or the two components may be applied successively as by the use of successive curtain coaters, but the specific manner of application of the coating or coatings is not considered to be of importance to the invention.

The proportions of ethylenically unsaturated monomer which are used in effecting the cure is not a feature of the invention, the proportions known to the art having the same significance in the invention. Thus, it is generally desired to employ at least 0.5 mol of styrene or other copolymerizable ethylenically unsaturated monomer per equivalent of available alpha,beta ethylenic unsaturation in the polyester. Preferably, at least 1 mol of styrene is used and most preferably from 2–4 mols of styrene per equivalent of alpha,beta ethylenic unsaturation is used to yield the most desirable properties. Larger excesses of ethylenically unsaturated monomer are also permissible, though these do not generally provide the best physical and chemical characteristics.

EXAMPLE 5

Example 4 is repeated using in place of styrene, a corresponding molar proportion of (1) vinyl toluene, (2) methyl methacrylate, and (3) acrylonitrile. Essentially the same results are produced in each instance.

As is known in the polyester art in which unsaturated polyesters are cured with copolymerizable ethylenically unsaturated monomer, the unsaturation in the monomer is desirably a vinyl unsaturation in which the vinyl monomer has the structure $CH_2{=}C{<}$, the preferred monomers for this purpose being styrene, vinyl toluene, acrylonitrile, and methyl methacrylate. Nevertheless, other vinyl monomers such as butyl methacrylate, ethyl acrylate, ethylene glycol dimethacrylate, and ethylene glycol acrylate are well adapted for the cross-linking cure and the specific unsaturated monomer which is selected is not a primary feature of the invention, any ethylenically unsaturated monomer capable of copolymerizing being broadly suitable.

A feature of the invention is the selection, as the cross-linking monomer, of monomers having allylic unsaturation, and particularly allyl esters of carboxylic acids such as diallyl phthalate and triallyl cyanurate. The more volatile and highly polymerizable vinyl monomers, such as styrene, are subject to losses of up to 25% during cure through volatilization and possess only limited storage stability in catalyzed compositions in accordance with the invention. In contrast, diallyl phthalate and triallyl cyanurate are high boiling compounds which do not volatilize during cure, providing 100% solids curing systems. Moreover, the allylic compounds are less reactive in addition polymerization providing one-package catalyzed systems of superior storage stability. Still further, these polyallylic compounds yield cured products having a higher heat distortion temperature and other desirable properties associated with diallyl phthalate such as improved dielectric properties. For these reasons, compositions comprising allylic monomers in accordance with the invention are well suited to use in laminating, casting and thick film coating applications.

Interestingly, coupled with more sluggish polymerization reactivity, the allylic compounds are more strongly inhibited by oxygen so that the invention is of particular importance in permitting cure in the presence of air. Of course, somewhat more elevated curing temperatures are required for allylic compounds such as diallyl phthalate, e.g., temperatures above 250° F., but the cure is again quite rapid (5–15 minutes) and takes place in the presence of air.

EXAMPLE 6

*Cure with allylically unsaturated monomer (diallyl phthalate)*

When the polyester product of Example 1 has cooled to a temperature of about 300° F., 100–400 parts per million of para-tert. butyl catechol is added for stability. Upon further cooling to a temperature below 250° F., the solution is thinned to contain 60% by weight of polyester using diallyl phthalate. Above 250° F., there is some tendency to gel. At lower temperatures the polyester becomes viscous and the thinner is added at any temperature, preferably an elevated temperature at which the polyester is easily stirred. To 100 parts of this solution is added 4 parts of a 50% solution of benzoyl peroxide in tricresyl phthalate. Films of this coating composition cure in the presence of air when baked for 8–10 minutes at 275° F.

While the invention has been illustrated in the foregoing examples, it will be understood that various modifications may be made such as the use of flow control agents, addition of pigments or dyes alone, or in combination, or the use of flatting agents, and the invention is not limited to the specific combinations shown in the examples but is, instead, defined in the claims which follow.

We claim:

1. Resinous polyester curable with styrene in the presence of air and consisting essentially of the heat-reaction product of ethylenically unsaturated dicarboxylic acid comprising a major molar proportion of fumaric acid, glycol comprising a major molar proportion of polyoxyalkylene glycol having a molecular weight up to about 1200, and diene comprising a major molar proportion of dicyclopentadiene in an amount providing at least 0.2 mol and up to 0.6 mol of dicyclopentadiene per mol of ethylenically unsaturated dicarboxylic acid.

2. Resinous polyester as recited in claim 1 in which at least 85 mol percent of said unsaturated dicarboxylic acid is fumaric acid.

3. Resinous polyester as recited in claim 1 in which at least 75 mol percent of said glycol is polyoxyalkylene glycol having a molecular weight up to 600.

4. Resinous polyester as recited in claim 1 in which at least 75 mol percent of said diene is dicyclopentadiene.

5. Resinous polyester as recited in claim 1 in which said dicarboxylic acid and said glycol components are employed in equivalent proportions of from 1.5:1 to 1:1.5.

6. Resinous polyester as recited in claim 1 in which said diene consists of dicyclopentadiene.

7. Resinous polyester curable with styrene in the presence of air and consisting essentially of the heat-reaction product of ethylenically unsaturated dicarboxylic acid comprising at least 85 mol percent of fumaric acid, glycol comprising a major molar proportion of polyoxyalkylene glycol having a molecular weight up to 600, and diene comprising at least 75 mol percent of dicyclopentadiene in an amount providing from 0.2–0.6 mol of dicyclopentadiene per mol of fumaric acid, and said dicarboxylic acid and said glycol components being present in equivalent proportions of from 1.25:1 to 1:1.25.

8. Resinous polyester as recited in claim 7 in which said dicarboxylic acid consists of fumaric acid.

9. Resinous polyester as recited in claim 7 in which said polyoxyalkylene glycol is diethylene glycol.

10. Resinous polyester as recited in claim 7 in which at least 60 mol percent of said glycol is polyoxyalkylene glycol.

11. In combination, resinous polyester curable with styrene in the presence of air and consisting essentially of the heat-reaction product of ethylenically unsaturated dicarboxylic acid comprising a major molar proportion of fumaric acid, glycol comprising a major molar proportion of polyoxyalkylene glycol having a molecular weight up to about 1200, and diene comprising a major molar proportion of dicyclopentadiene in an amount providing 0.2–0.6 mol of dicyclopentadiene per mol of fumaric acid and an ethylenically unsaturated monomer capable of copolymerizing with said polyester.

12. A combination as recited in claim 11 in which said ethylenically unsaturated monomer contains the $CH_2=C<$ group.

13. A combination as recited in claim 11 in which said ethylenically unsaturated monomer is selected from the group consisting of styrene, vinyl toluene, acrylonitrile, and methyl methacrylate.

14. A combination as recited in claim 11 in which said ethylenically unsaturated monomer is a polyallyl ester.

15. A combination as recited in claim 14 in which said polyallyl ester is selected from the group consisting of diallyl phthalate and triallyl cyanurate.

16. A combination as recited in claim 11 in which a free-radical generating catalyst is present to facilitate copolymerization of said ethylenically unsaturated monomer with said resinous polyester.

17. A combination as recited in claim 11 in which there is present at least 0.5 mol of styrene per equivalent of available $\alpha,\beta$-ethylenic unsaturation in said polyester.

References Cited

UNITED STATES PATENTS

| | | | |
|---|---|---|---|
| 2,235,447 | 3/1941 | Bradley et al. | 260—75 |
| 2,253,681 | 8/1941 | Bradley | 260—22 |
| 2,421,876 | 6/1947 | Gerhart | 260—871 |
| 2,600,457 | 6/1952 | Wynstra | 260—22 |
| 2,608,550 | 8/1952 | Rowland et al. | 260—78.5 |
| 2,671,070 | 3/1954 | Knapp | 260—861 |
| 2,973,332 | 2/1961 | Fikenstscher | 260—75 |

FOREIGN PATENTS 609,648 10/1948 Great Britain.

OTHER REFERENCES

Golding, "Polymers and Resins," 1959, Nostrand Co., p. 538.

SAMUEL H. BLECH, *Primary Examiner.*

WILLIAM SHORT, MURRAY TILLMAN, *Examiners.*

N. OBLON, *Assistant Examiner.*